UNITED STATES PATENT OFFICE.

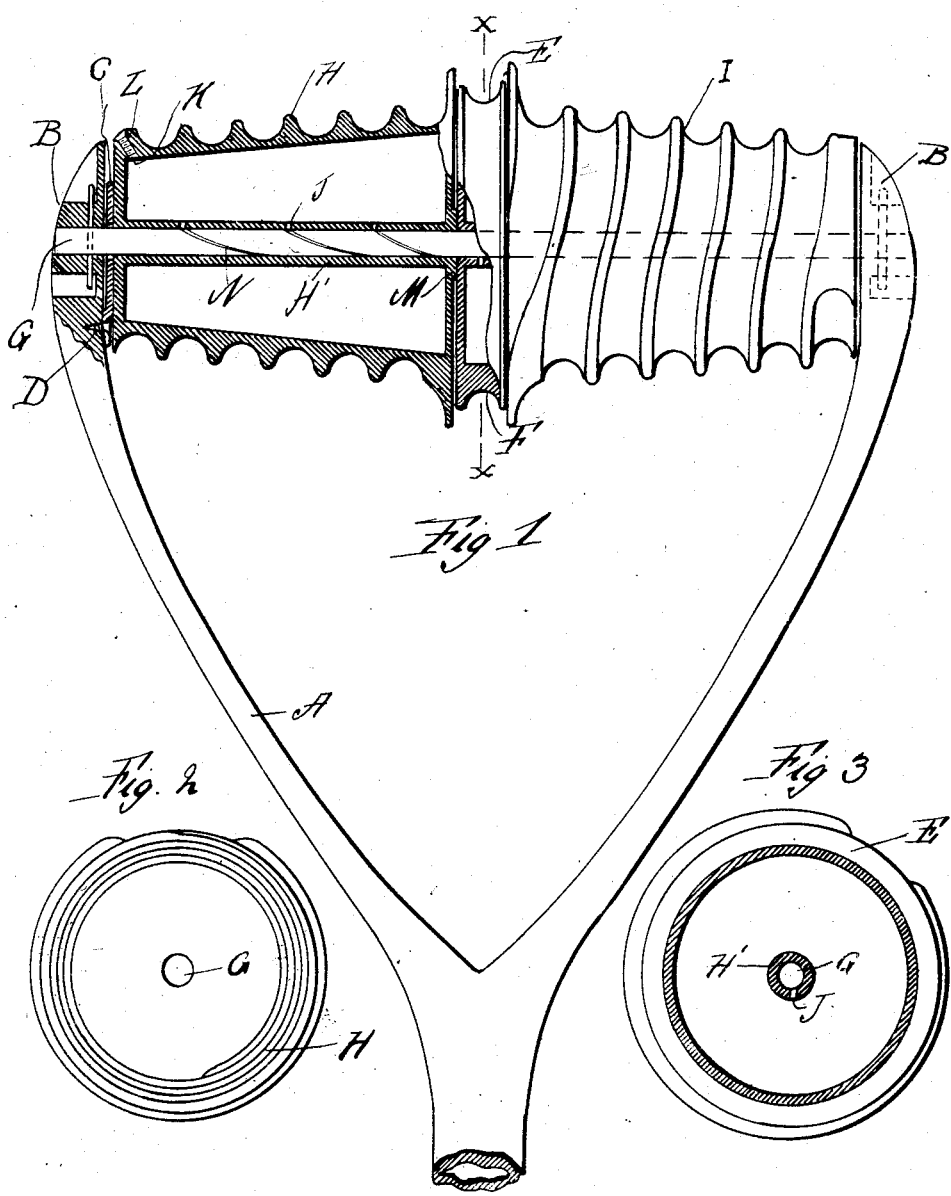

FREDERICK C. BAUER, SR., AND FREDERICK C. BAUER, JR., OF CAMDEN, NEW JERSEY.

TROLLEY.

No. 906,994.　　　Specification of Letters Patent.　　　Patented Dec. 15, 1908.

Application filed May 1, 1908. Serial No. 430,327.

*To all whom it may concern:*

Be it known that we, FREDERICK C. BAUER, Sr., and FREDERICK C. BAUER, Jr., residing at Camden, county of Camden, and State of New Jersey, have invented a certain new and useful Improvement in Trolleys, of which the following is a specification.

Our invention relates to a new and useful improvement in trolleys, and has for its object to provide an exceedingly simple and effective device of this character which will be as equally effective in winter as in summer, and adapted to keep the wire central of the trolley and directed to the center in case the wire comes in contact with any other portion of the trolley surface.

A further object of our invention is to provide a trolley which will be self lubricating.

With these ends in view, this invention consists in the details of construction and combination of elements hereinafter set forth and then specifically designated by the claims.

In order that those skilled in the art to which this invention appertains may understand how to make and use the same, we will describe its construction in detail, referring by letter to the accompanying drawing forming a part of this specification, in which—

Figure 1 is a side elevation of a portion of a trolley harp provided with our improved trolley, a portion thereof being shown in section. Fig. 2, an end view of a trolley wheel showing the different elevations of the helix, and Fig. 3, a sectional view at the line X—X of Fig. 1.

In carrying out our invention as here embodied, A represents a trolley harp or standard which may be of the ordinary construction but here shown as having the upper ends of the forked portion rounded as indicated at B so that it will not come in contact with the cross wires which hold the trolley wire in position.

C indicates a resilient metallic material the lower portion of which is secured to the ends of the harp by means of the screws D, the free portion of said material resting against the ends of the trolley wheel, thus reducing the noise caused by rattling to a minimum.

E represents a portion of our improved trolley wheel which is a small roller having a deep groove F therein and this is centrally located upon the axle G. On either side of this portion E is placed a conical elongated roller H and I which taper from the outer to the inner ends and the peripheries thereof are provided with deep spiral grooves the general direction of which runs from the outer ends to the inner ends or toward the small roller E. These rollers H and I are hollow and have a hollow shaft H' formed therewith and running through the central portions thereof, and these hollow shafts have formed therein the openings J to allow the oil to pass from the hollow portion of the rollers H and I on to the axle G.

In order that oil or other suitable lubricant may be placed in the hollow portions of the rollers H and I, we provide the openings K in which is threaded the screw plug L so that dust or any other foreign substance may be prevented from entering the same. On the inner ends of the rollers H and I are formed the bosses M which rest against the roller E thus limiting the movements of said roller E. On the surface of the axle G are formed the grooves N the general direction of which runs from the outer ends to the central portion thereof so that the oil which passes from the rollers H and I will be directed toward the roller E thus keeping it always well lubricated.

It will be seen that the trolley thus made is simple but effective, will make but little noise and needs but little attention as one filling of oil will last a considerable time.

Having thus fully described our invention, what we claim as new and useful, is—

1. In a trolley, a harp the ends of the fork being rounded, a resilient metallic material secured thereto, a centrally located roller having a groove, hollow conical rollers having deep spiral grooves cut on the periphery thereof and an opening formed therein in which a threaded plug is adapted to be inserted, a hollow shaft formed through the central portion of said rollers having openings formed therein, bosses formed on the inner ends of the spiral rollers, and an axle having grooves formed thereon passing through the rollers, the ends of which are secured to the forked portion of the trolley harp, as shown and described.

2. A trolley consisting of a centrally located roller having a groove cut therein, elongated rollers having tapered ends with spiral grooves about said tapered portions communicating with said centrally located roller, said elongated rollers having openings cut therein, plugs adapted to be threaded in said openings, shafts centrally located within said rollers having openings formed therein, bosses formed on the inner ends of said elongated rollers, a shaft having grooves formed thereon passing through said rollers secured to the ends of the forked portion of a trolley harp, and resilient members secured to the ends of a trolley harp adapted to press against the ends of the elongated rollers preventing the rattling of the same, as specified.

In testimony whereof, we have hereunto affixed our signatures in the presence of two subscribing witnesses.

FREDERICK C. BAUER, Sr.
FREDERICK C. BAUER, Jr.

Witnesses:
FRANK RICHARD LIEBERT,
OTTO BETZ.